United States Patent

MacDonald et al.

[11] 4,365,305
[45] Dec. 21, 1982

[54] VECTOR GENERATOR FOR COMPUTER GRAPHICS

[75] Inventors: John B. MacDonald, West Windsor Township, Mercer County; John K. Patberg, Cranford Township, Union County, both of N.J.; Jaan Raamot, Broomfield, Colo.

[73] Assignee: Western Electric Company, Inc., New York, N.Y.

[21] Appl. No.: 222,429

[22] Filed: Jan. 5, 1981

[51] Int. Cl.³ .................................................. G06F 3/14
[52] U.S. Cl. .................................. 364/521; 340/707; 340/739; 340/741
[58] Field of Search .............. 364/520, 521, 515, 719; 340/707, 736, 741, 739, 365 P; 178/18; 358/257, 903

[56] References Cited

U.S. PATENT DOCUMENTS

| | | | |
|---|---|---|---|
| 3,221,186 | 11/1965 | MacDonald et al. | 307/490 |
| 3,346,853 | 10/1967 | Koster et al. | 364/900 |
| 3,534,338 | 10/1970 | Christensen et al. | 364/200 |
| 3,539,860 | 11/1970 | Max et al. | 315/376 |
| 3,576,461 | 4/1971 | Raciti | 315/367 |
| 3,582,705 | 6/1971 | Waller | 315/367 |
| 3,643,124 | 2/1972 | Aiani et al. | 340/739 |
| 3,649,819 | 3/1972 | Waller | 364/521 |
| 3,651,508 | 3/1972 | Scarborough, Jr. et al. | 340/739 |
| 3,653,001 | 3/1972 | Ninke | 340/739 |
| 3,718,834 | 2/1973 | Bacon et al. | 307/260 |
| 3,723,802 | 3/1973 | Granberg et al. | 315/367 |
| 3,728,575 | 4/1973 | Granberg et al. | 315/376 |
| 3,800,183 | 3/1974 | Halio et al. | 315/367 |
| 3,801,740 | 4/1974 | Buzzard et al. | 179/2 TV |
| 3,812,485 | 5/1974 | Moreton | 340/741 |
| 3,869,085 | 3/1975 | Green | 340/739 |
| 4,027,148 | 5/1977 | Rosenthal | 340/741 |
| 4,056,713 | 11/1977 | Quinn | 364/521 |
| 4,190,831 | 2/1980 | Stahle et al. | 340/707 |
| 4,266,253 | 5/1981 | Matherat | 340/707 |
| 4,277,783 | 7/1981 | Sampieri et al. | 340/707 |

FOREIGN PATENT DOCUMENTS 1109441 4/1968 United Kingdom .

Primary Examiner—Gary Chin
Attorney, Agent, or Firm—M. Pfeffer

[57] ABSTRACT

A vector generator (11) for a computer graphics system of the type in which the beam (26) of a CRT (13) is deflected by analogue deflexion signals to form an image comprised of a plurality of discrete vectors each defined, in each of two, orthogonal deflexion axes, the first and second digital words respectively defining the initial position and the length of the vector. The vector generator (11) includes circuitry (43, 44) that ensures that each vector is drawn with substantially uniform brightness regardless of the length of the vector. Additional circuitry (42, 54) is furnished so that an instantaneous indication may be obtained of a light pen (19) strike or the occurrence of edge violations. This circuitry (42, 54) also yields continuous digital information concerning the current beam position.

7 Claims, 5 Drawing Figures

VECTOR GENERATOR FOR COMPUTER GRAPHICS

TECHNICAL FIELD

Broadly speaking, this invention relates to computer graphics. More particularly, in a preferred embodiment, this invention relates to methods and apparatus for generating the vectors which are used to form the images displayed on the screen of a cathode ray tube.

BACKGROUND OF THE INVENTION

In computer graphics, the device that displays the desired graphic output, typically a special-purpose cathode ray tube (CRT), may either be an analogue-driven device or a digitally-driven device.

In a digitally-driven device, an individual vector is drawn by first brightening-up the electron beam to display a single dot then, after some suitable delay, blanking the beam to cause the dot to disappear. Next, the deflexion potentials applied to the X and Y deflexion circuits are incrementally increased to move the beam through some discrete displacement in a direction lying along the desired vector. The beam is then brightened-up again to display a second dot. This process is repeated until the desired vector has been drawn on the face of the CRT.

A close examination of the display screen will reveal that the vector is actually comprised of a series of closely-spaced dots; however, at normal viewing distances, these dots tend to merge giving the impression of a continuous, illuminated line, i.e., the desired vector.

In an analogue-driven device, on the other hand, the same vector is drawn by first brightening-up the beam, then continuously increasing the X and Y deflexion potentials to sweep the fully brightened-up beam in the desired direction until the end point of the vector is reached, at which time the beam is blanked-off.

Digitally-driven display systems have several advantages not possessed by analogue-driven systems. Among these are the fact that: (1) the deflexion logic is simple to implement; and (2) accurate digital information concerning the instantaneous position of the electron beam is always available. This latter fact is particularly advantageous if a light pen is associated with the graphics display. Furthermore, in a digitally-driven system, it is easy to detect edge violations because the moment that the beam goes off the edge of the screen an overflow condition must, of necessity, exist in at least one of the registers which keep track of the beam position.

Notwithstanding the above, there are some serious drawbacks to the use of digitally-deflected display devices. Among these is the fact that because the beam is moved in a series of discrete steps, rather than continuously, the display can only be brightened-up after the beam has settled down to its steady-state position. However, as is well known, the digital-to-analogue converters (DAC's) which are typically used to convert the digital beam-position information into the analogue signals actually required to deflect the beam are far from perfect, and it takes a small but finite time for the analogue output to catch up to the digital input. This effect is particularly troublesome when there is a change in one of the more significant bits of the input to the DAC. In the case of the most significant bit (MSB), for example, a change from a binary "0" to a binary "1" represents but a single increment in beam position but, nevertheless, cause a major change in the format of the bit pattern comprising the digital word. This, in turn, results in an unwanted and troublesome transient in the output of the DAC. This transient is caused by the one-bit change in the MSB rippling-through all of the stages in the DAC. Because of this problem, a typical digitally-deflected graphics device is forced to use a relatively long time intervals between successive deflexion points.

For these and other reasons, considerable interest has been expressed in a return to analogue deflexion even though, heretofore, analogue deflexion apparatus has been unable to furnish accurate information concerning the instantaneous position of the electron beam and lacks the ability to quickly detect edge violations.

SUMMARY OF THE INVENTION

As a solution to these and other problems, the instant invention comprises an analogue-driven computer graphics device which is free from the defects of the prior art. More particularly, the invention comprises a vector generator for use with a computer graphics system of the type wherein a vector is drawn by applying analogue deflexion signals to a display device to deflect an image-writing beam across the face of the display device. The vector is defined by first digital words defining the planar coordinates of the starting point of the vector and by second digital words defining the displacement of the vector from said starting point. The first digital words are converted into first analogue signals to deflect the image-writing beam to the starting point of the vector. The second digital words are converted into second analogue signals to move the image-writing beam from the starting position towards the end point of the vector to be drawn. As the vector is drawn, the coordinates of the instantaneous position of the beam are continuously tracked digitally.

The invention and its mode of operation will be more fully understood from the following detailed description, when taken with the appended drawings, in which:

DETAILED DESCRIPTION

Figure 1:
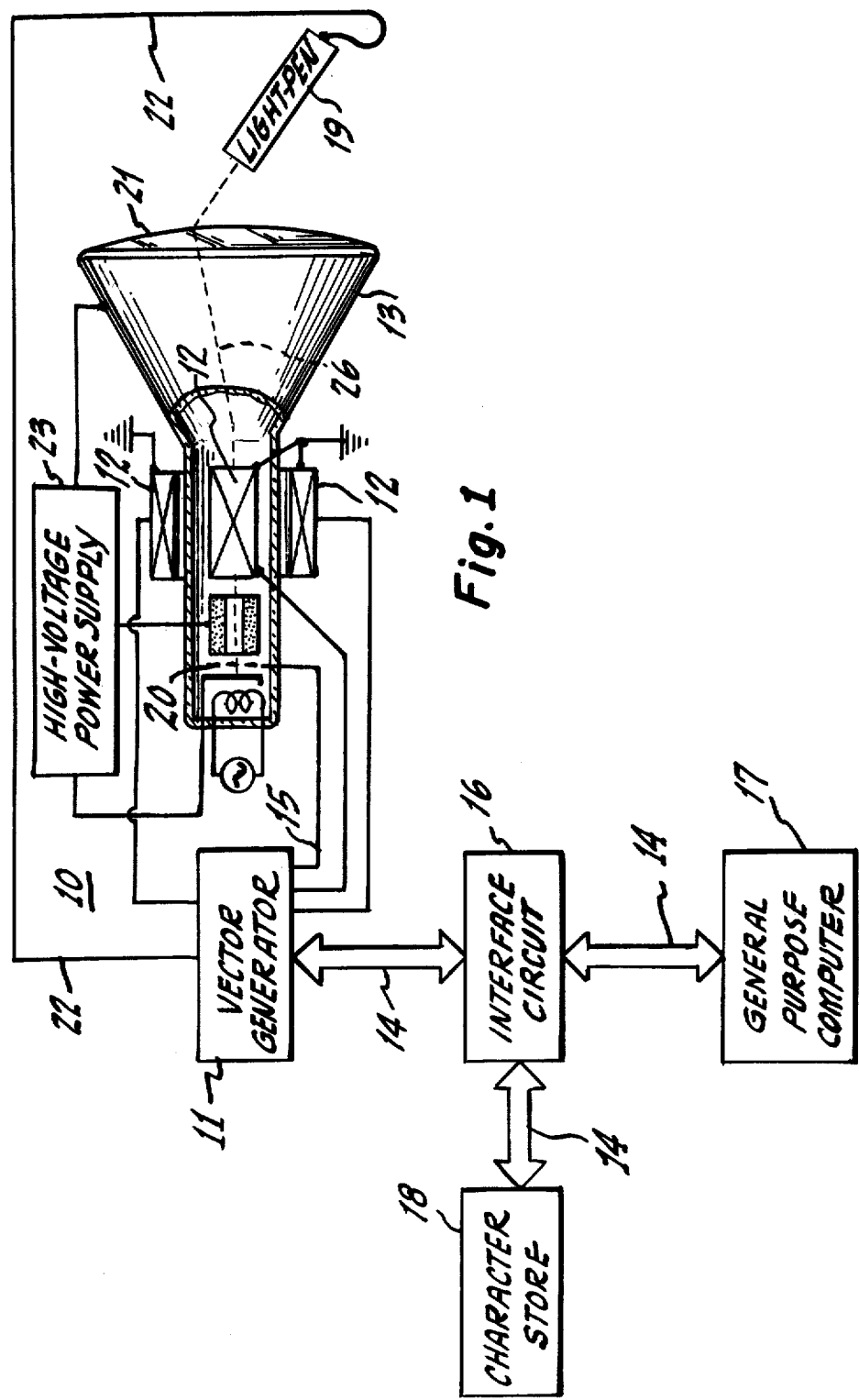
FIG. 1 is a partially block, partially schematic diagram of an illustrative computer graphics system which sets the operating environment for the vector graphics generator according to the invention.

FIG. 1 is a block schematic diagram that shows the typical operating environment for a vector generator according to the invention. As shown, graphics system 10 comprises a vector generator 11, the output of which is connected to the deflexion coils 12 of an electromagnetically-deflected CRT 13, such as a Kratos Model M321 or an XY Tronics 21, and, via an n-bit, bi-directional data bus 14, to a microprocessor-controlled interface circuit 16. The interface circuit 16, in turn, is connected to some suitable general purpose digital computer 17, for example, a Digital Equipment Corporation PDP 11, and to a character store 18, for example, an 8K, solid-state, read-only memory (ROM). A light pen 19, which is physically associated with the screen 21 of the CRT 13, is also connected to the vector generator 11, via some suitable flexible cable 22. The cathode, the focusing electrodes, and the anode of the CRT 13 are connected to some suitable high-voltage power supply 23, in a conventional manner. The electron beam 26 within CRT 13 is brightened-up (e.g., turned on) by means of a control grid 20 connected to the vector generator 11 via a lead 15. Of course, this mechanism is also used to blank (e.g., turn off) the beam.

Figure 2:
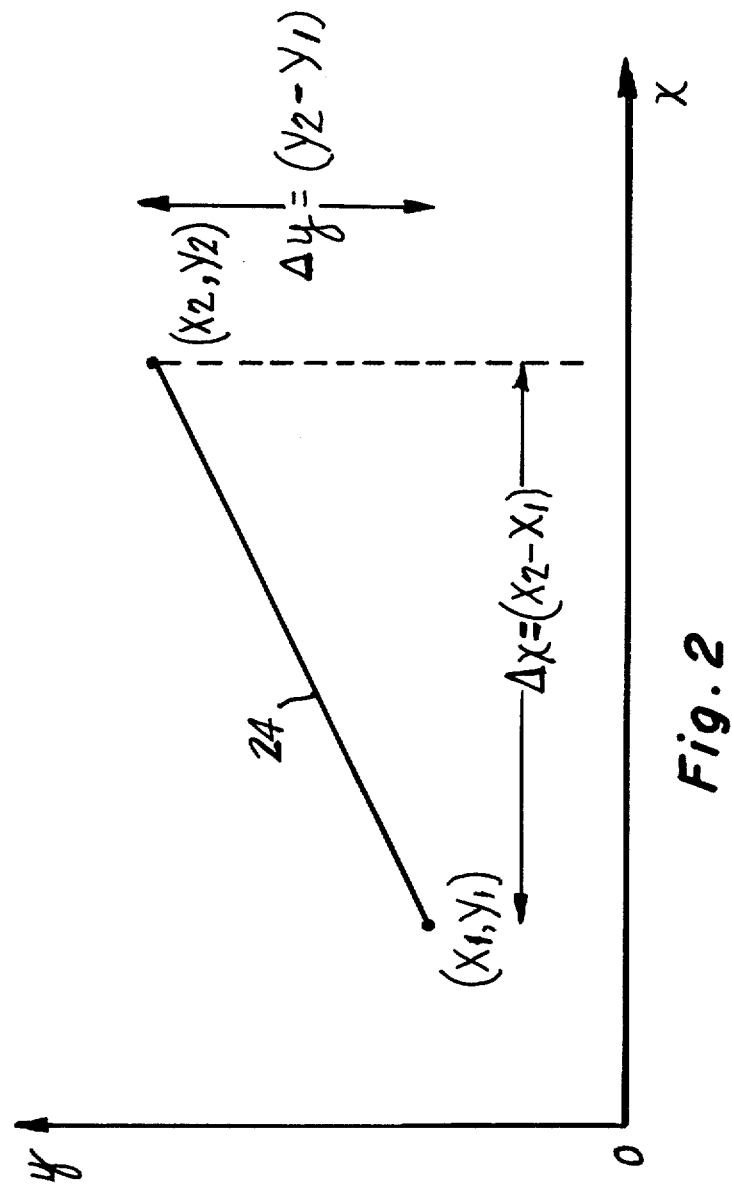
FIG. 2 is a graph depicting the manner in which the vectors comprising the graphics image displayed in the system of FIG. 1 are defined.

Turning momentarily to FIG. 2, it will be apparent that any vector 24 to be drawn on the screen of the CRT 13 can be defined by specifying both its starting point ($X_1$, $Y_1$) and its end point ($X_2$, $Y_2$). Alternatively, the vector can be defined by specifying its starting point ($X_1$, $Y_1$) and the respective displacements $\Delta X$ and $\Delta Y$ from that starting point. Obviously, given a vector's starting point and its displacement along both the X and Y axes, it is a trivial matter to compute the end point. Similarly, given the end point and the starting point, it is also a trivial matter to compute the displacements.

For reasons that will subsequently become apparent in the illustrative embodiment, the information that the interface circuit 16 forwards to the vector generator 11 defines the starting point (i.e., the initial position) and the displacement (i.e., the length) of each vector to be drawn. From this information, the vector generator 11 generates the analogue signals which are necessary to deflect the electron beam 26 so that the beam traces the desired vector on the screen 21 of the CRT 13.

In order to position the beam 26, the display screen 21 is divided into a grid of suitable size, for example, 1024 by 1024 positions. Any position within the grid may then be selected by specifying its X and Y coordinates. Digitally, this requires a 10-bit binary word for each coordinate (i.e., $2^{10}=1024$). Thus, in the illustrative embodiment, for both the X and Y axes, the vector generator 11 will receive from the interface circuit 16 two, 10-bit, binary words, one specifying the initial position of a vector to be drawn and the other specifying the length of the vector. One skilled in the art will appreciate that the invention is suitable for use with graphics systems that can address more or less than 1024 discrete locations. Of course, appropriate changes must be made to the size of the words which define the initial position and length of each vector to be drawn as well as the size of the registers that process and store this information.

As will subsequently be explained, additional digital inputs to the vector generator 11 specify the mode desired for each vector, that is to say, instructions which inform the generator how the specified vector is to be drawn. For example, these instructions might concern vector intensity or vector modulation, i.e., whether the vector is to be continuously displayed or whether the intensity is to be controlled in such a manner that the vector is drawn as a dashed line, rather than a solid line, etc.

The microprocessor-controlled interface 16 and the general purpose computer 17 could be combined into a single instrumentality, if desired. However, the arrangement shown in FIG. 1 is preferred because, by merely re-programming the interface circuit 16, the vector generator 11 and the CRT 13 can be interfaced to a wide variety of general purpose computers, making for far greater user flexibility. More importantly, the division of computing power that results from the arrangement shown expedites high-speed data transfer and function decoding with a consequent increase in throughput.

The character store 18 which, as previously noted, advantageously comprises a solid-state ROM, stores the shapes of one or more sets of the alphanumeric characters to be displayed by the CRT 13. If desired, the shapes of these characters could be stored in the random access memory associated with the general purpose computer 17, but the arrangement shown in FIG. 1 is preferred because it minimizes the number of interactions needed between the computer and the vector generator, yet still provides the multi-font capability desired by most computer graphics users.

Figure 3:
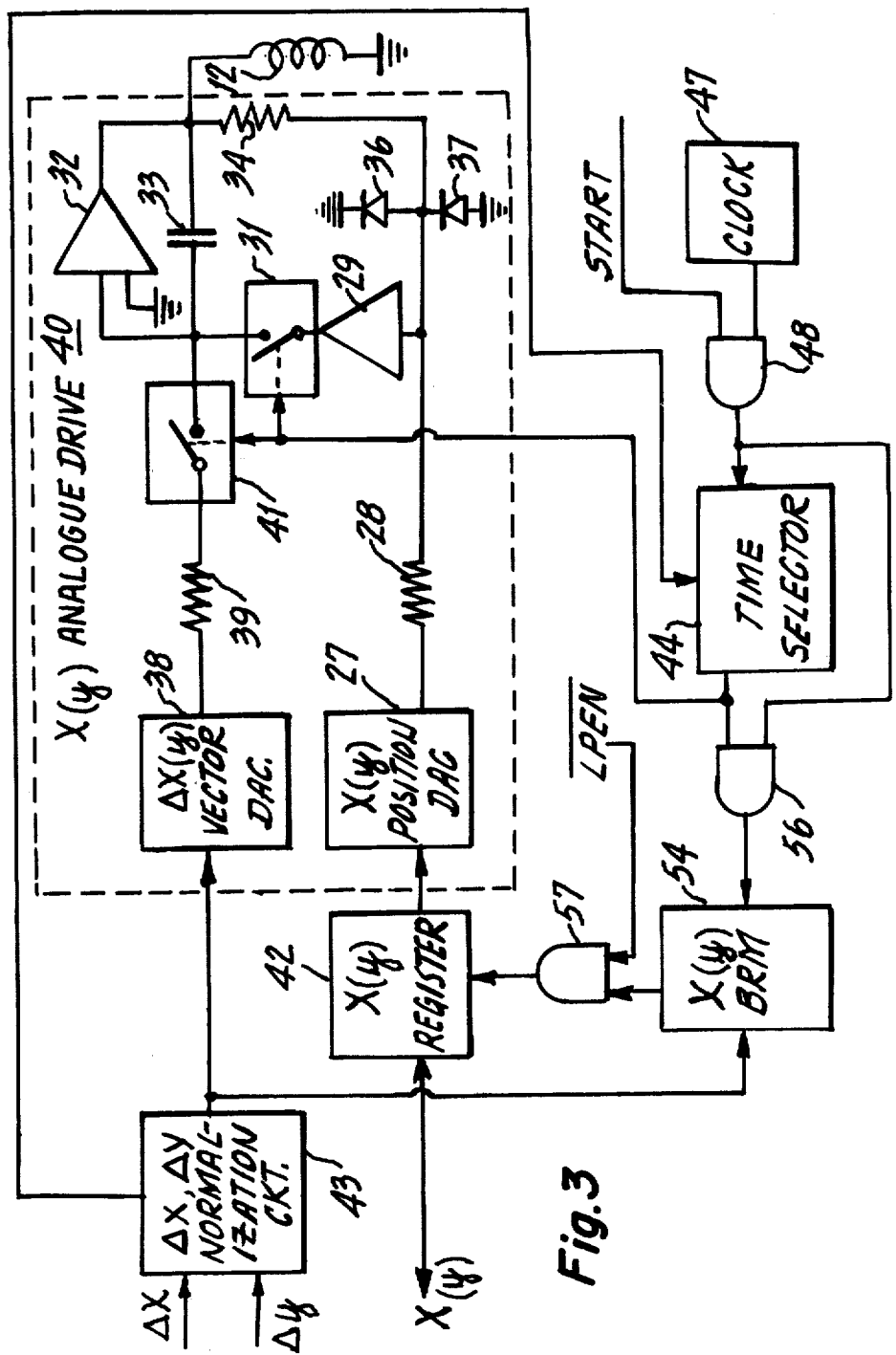
FIG. 3 is a partially block, partially schematic diagram of an illustrative vector generator according to the invention.

FIG. 3 depicts vector generator 11 in detail. It should be noted that the (y) suffix employed in FIG. 3 indicates that although only one block or element is shown for performing a given function, the vector generator 11 actually includes two identical units, one for performing X coordinate functions and one for performing Y coordinate functions. Those units without such a designation (or otherwise designated) perform functions common to both coordinate. Indeed, this seems an appropriate place to point out that because of identity of operation, and in the interest of simplicity, in the balance of the following description, only X-axis functions will be generally referred to. Also, to simplify the explanation, we shall only consider the generation of positive vectors, since the procedure used to generate negative vectors is entirely analogous.

The vector generator 11 includes a first digital-to-analogue converter (DAC) 27 which receives a 10-bit binary word representative of a desired X coordinate (e.g., $X_1$) of the beam 26 and converts that word into a corresponding analogue voltage (e.g., $V_1$) which appears at the output of the DAC. The output of the DAC 27, termed the X-position DAC, is connected, via a resistor 28, a unity gain amplifier 29 which serves as an impedance transformer, and a switch 31, to the input of an operational amplifier 32. The output of the amplifier 32 is connected to the X deflexion coils 12 of the CRT 13. Additionally, the output of the amplifier 32 is fed back to the input via a capacitor 33 or the capacitor in parallel with a resistor 34. A pair of oppositely poled diodes 36 and 37 are connected between the input of the unity gain amplifier 29 and ground.

A second digital-to-analogue converter (DAC) 38, termed the $\Delta X$-vector DAC, is provided for receiving a 10-bit binary word representative of a desired $\Delta X$ vector and converting that word into a corresponding analogue voltage ($\Delta V$) which appears at the output of the DAC. The output of the DAC 38 is connected, via a resistor 39 and a switch 41, to the input of the operational amplifier 32. It should be noted that the switches 31 and 41, although shown as single-pole, single-throw switches, are preferably electronic switches which are arranged and operated such that when one switch is open the other is closed and vice-versa, i.e., both switches are never open or closed at the same time.

Before proceeding to a description of the rest of the circuit of FIG. 3, it might be helpful to discuss the operation of the circuitry so far described, which may be thought of as the analogue drive portion 40 of the vector generator 11.

The heart of the analogue portion 40 is the operational amplifier 32 which, as is conventional, has a very high negative gain and, as has been noted, has a feedback loop comprising either the capacitor 33 by itself (the switch 31 open and the switch 41 closed) or the capacitor 33 in parallel with the series branch comprised of the resistor 34, the unity gain amplifier 29 and the switch 31 (switch 31 closed and switch 41 open). In either case, the operational amplifier 32 is in a negative feedback configuration. As is well known, in such a configuration, each input to the amplifier will be at essentially the same voltage potential because any deviation is greatly amplified and fed back until the difference is zero. Thus, in the case of the amplifier 32, since one terminal is grounded, the other terminal is also essentially at ground.

The operation of the analogue drive portion 40 will now be explained. Assume that the switch 31 is closed, that the switch 41 is open, and that a digital signal corresponding to $X_1$ is applied to the DAC 27. As a result, an analogue signal $V_1$ will appear at the output of the DAC and at one end of the resistor 28. Since the input of the amplifier 32 is essentially at ground, as explained above, the output and input of unity gain amplifier 29 must also be at ground. Accordingly, the current through the resistor 28 is equal to the voltage developed at the output of the DAC 27 ($V_1$) divided by the resistance of the resistor 28 ($R_{28}$), i.e., $I = V_1/R_{28}$.

Because of the high input impedance of the amplifier 29, and because the diodes 36 and 37 cannot conduct under these circumstances, the current I flowing through the resistor 28 also flows through the resistor 34, whereby a voltage $V_x$ is developed thereacross and at the output of the amplifier 32. The voltage $V_x$ is equal to $IR_{34}$, where I is the current flowing through resistor 34 and $R_{34}$ is the resistance thereof. Now since $I = V_1/R_{28}$ the voltage $V_x = V_1 R_{34}/R_{28}$.

Hence, the voltage $V_x$ is directly proportional to the voltage $V_1$. Typically, the resistors 28 and 34 are made equal to one another so that $V_x = V_1$. Since the output $V_1$ is applied to the X-deflexion coil 12, the beam is therefore deflected to the position $X_1$.

The reason why neither diode 36 nor diode 37 can conduct at this time is, of course, because the negative feedback loop holds the input to the unity gain amplifier 29 at ground potential. When the feedback loop is broken, e.g., by opening the switch 31, this situation may change and cause undesirable transients. This is the reason that the circuit shown includes the diodes 36 and 37 which act to limit the rate of output voltage change during vector position resetting operations controlled by the position DAC 27.

To begin what is essentially an integration process, after a predetermined interval, the switch 31 is opened and the switch 41 is closed. The digital signal corresponding to the desired vector displacement, $\Delta X$, is supplied to the input of the vector DAC 38. The output current from the DAC 38 is fed, via resistor 39, to capacitor 33 and the operational amplifier 32 which together function as a conventional, operational amplifier-integrator. Thus, the voltage $V_1$ already present at the output of the operational amplifier 32 will change at a rate specified by the input applied to the DAC 38, to cause the electron beam 26 in the CRT 13 to move linearly along the X axis. This is shown in FIG. 2 where $X_1$ represents the starting position of the vector, as determined by the digital signal fed into the DAC converter 27, and $\Delta X = (X_2 - X_1)$ represents the length of the vector, as determined by the digital signal which is input to the DAC 38.

Turning now to the digital portion of the circuit of FIG. 3, it includes a position register 42 for receiving a 10-bit binary word representative of a desired X position. The output of the position register 42 serves as the input to the position DAC 27.

A conventional normalization circuit 43 is provided for receiving a 10-bit binary word representative of a desired $\Delta X$ displacement and for receiving a 10-bit binary word representative of a desired $\Delta Y$ displacement. Briefly, the normalization circuit 43, which is common to both X and Y, functions to shift both the $\Delta X$ and the $\Delta Y$ words to the left until one or the other of them exhibits a binary "1" in the higher order bit position. This process, as will be discussed more fully below, assures that vectors are drawn at essentially the same rate and hence exhibit essentially the same intensity.

Figure 5:
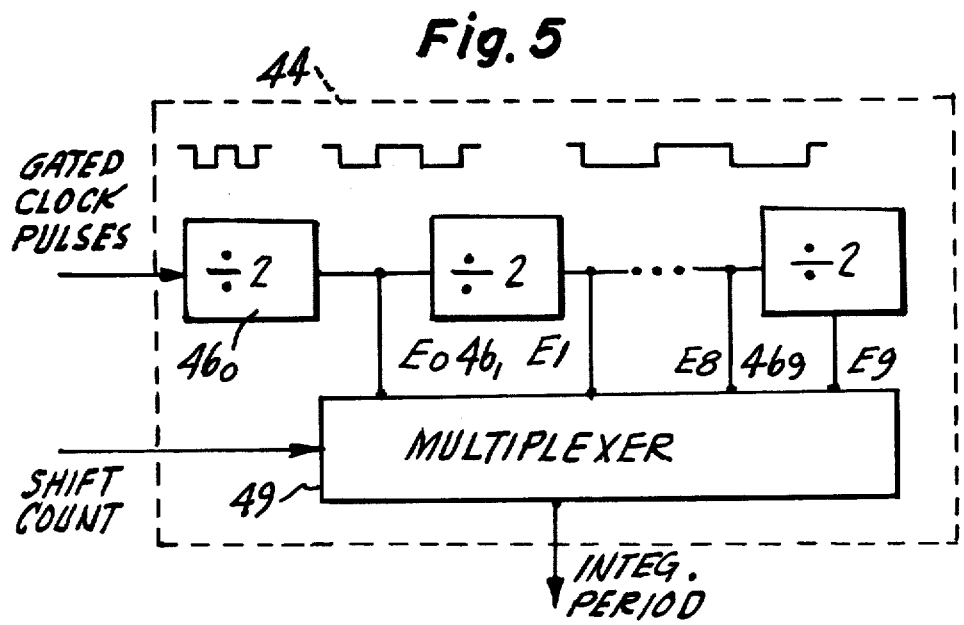
FIG. 5 is a block schematic diagram of an illustrative time selector for use with the vector generator of FIG. 3.

Since the vectors are drawn at essentially the same rate, it is necessary to vary the drawing time to achieve the proper length. This is done by the time selector 44. As shown in FIG. 5, the time selectror 44 advantageously includes a chain of ten, tandem-connected, divide-by-two counters $46_0$–$46_9$ driven by a gated clock pulse derived from a crystal controlled, master clock pulse generator 47 (FIG. 3) via an AND gate 48. The AND-gate 48 is enabled upon receipt of a start signal from the computer 17 via the interface unit 16. The output $E_9$ of the last divide-by-two stage, e.g., from counter $46_9$, has the greatest duration of all the stages, while the output $E_0$, from counter $46_0$ has the shortest duration, with the periods decreasing by factors of two as one proceeds from $E_9$ down to $E_0$.

The time selector 44 also includes a multiplexer 49 which under the control of a signal from the normalization circuit 43, representative of the number of normalization shifts, selects one of the outputs $E_0$–$E_9$. The selected output is coupled to the switches 31 and 41 to control the time of integration and hence the length of the vector being drawn. More specifically, since the normalization circuit multiplies each vector to be drawn, i.e., $\Delta X$ or $\Delta Y$, by a factor of $2^n$, where n is the number of left shifts, it is necessary to shorten the drawing interval (i.e., the integration period) by the same factor so that a vector of the correct length is drawn.

This is done by the time selector 44 in accordance with the number of normalization shift pulses. More specifically, if no shifts have occurred, then the maximum integration period, $E_9$, will be selected; if, however, one shift has occurred, representing a multiplication of $\Delta X$ by two, then it is necessary to shorten the integration period by a factor of two and therefore the period $E_8$, which is half of $E_9$, will be selected. The other periods are selected using the same criteria as reflected in Table I below.

TABLE I

| Shift Pulses | Integration Period |
|---|---|
| 0 | $E_9$ |
| 1 | $E_8$ |
| 2 | $E_7$ |
| 3 | $E_6$ |

TABLE I-continued

| Shift Pulses | Integration Period |
|---|---|
| 4 | $E_5$ |
| 5 | $E_4$ |
| 6 | $E_3$ |
| 7 | $E_2$ |
| 8 | $E_1$ |
| 9 | $E_0$ |

Typically, the clock generator 47 may operate at a frequency of 20 MHz, whereby the output of $E_0$, the shortest integration period, will be $0.1\mu$ second and the output $E_0$, the longest integration period will be $51.2\mu$ seconds.

Figure 4:
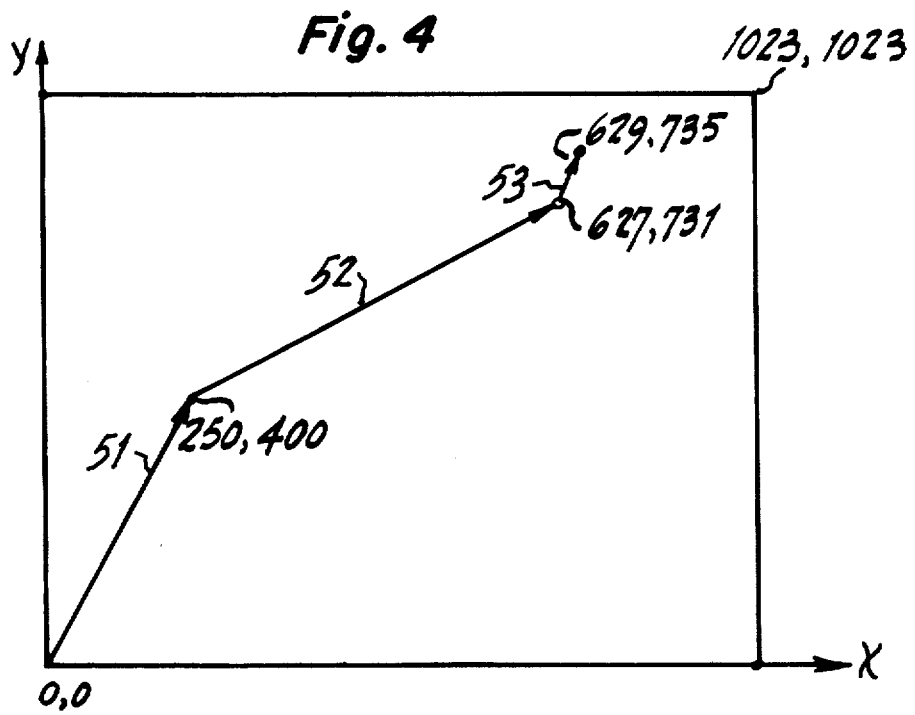
FIG. 4 is a graph illustrating the manner in which the vector generator according to the invention may be used to draw vectors of differing size.

Let us now consider one or two specific examples, for example, the drawing of the vector 51 from point (0,0) to point (250,400) in FIG. 4.

Now, $250_{10} = 111110102$, and
$400_{10} = 1100100002$.

Supplying leading zeroes so that both numbers become 10-bit numbers, the $\Delta X$ and $\Delta Y$ signals are, $\Delta X = 0011111010$, and
$\Delta Y = 0110010000$.

The previously discussed shift-normalizing process is now invoked to shift both the $\Delta X$ and $\Delta Y$ signals to the left, one bit at a time, until a binary "1" appears in at least one of the high-order bit positions. In the example given, only one leftward shift is required as this will move a binary "1" into the high order bit position of the $\Delta Y$ signal. After shifting, the new $\Delta X$ and $\Delta Y$ signals, which we shall identify as $\Delta X'$ and $\Delta Y'$, to avoid confusion, are given by:

$\Delta X' = 0111110100$; and
$\Delta Y' = 1100100000$.

Converting back to decimal numbers, we obtain:

$\Delta X' = 500_{10}$; and
$\Delta Y' = 800_{10}$.

Since only one shift to the left was necessary, the shift count is one and the $E_8$ output of the counter chain 46<sub>0</sub>–46<sub>9</sub> is selected. This output has the second longest duration of any of the ten counter outputs and will gate the integration and display process so that the desired vector will be drawn, with the correct length, as shown by the vector 51 in FIG. 4.

It is important to note that, although vector 51 is a fairly short vector, it will be drawn with approximately the same intensity as a maximum length vector because it is drawn at substantially the same rate as the maximum length vector, albeit for a shorter time. Another way to look at it is to say that, although the desired vector extends from point (0,0) to point (250,400), the vector generator 11 according to the invention draws the vector as if it extended from point (0,0) to point (500,800) but blanks-out the electron beam 26 and terminates the integration process after only half the vector has been drawn.

To avoid cumulative integration errors, the inputs to the position DAC's 42 are changed to the binary equivalents of $250_{10}$ and $400_{10}$, respectively, so that when the integration process is completed the electron beam will be accurately positioned at the desired point (250,400), which is not only the end point of the vector currently being drawn, but also the starting point for the next vector to be drawn.

Let us now consider the drawing of a vector 52 from the end point of vector 51, i.e., from the point (250,400) to the point (627,731). As previously mentioned, the inputs to the position DAC's 42 will have already been changed to the binary equivalents of $250_{10}$ and $400_{10}$, the end point of vector 51 and the starting point of vector 52. Obviously, it takes but a few microseconds for computer 17 to compute that for vector 52, $$\Delta X = (627-250)$$
$$= 377_{10}$$
$$= 0101111001_2$$
and
$$\Delta Y = (731-400)$$
$$= 331_{10}$$
$$= 0101001011_2.$$

Again, shifting both the $\Delta X$ and $\Delta Y$ signals one bit to the left, will yield a binary "1" in the most significant bit position and the resulting shift count of one will again cause selection of the $E_8$ output. Thus, vector 52 will be drawn correctly and will have substantially the same brightness as vector 51. Once again, the position DAC's 42 will be loaded with the starting point of the next vector to be drawn, i.e., the binary equivalent of $627_{10}$ and $731_{10}$.

As a final example, let us consider the drawing of vector 53 an extremely short vector starting at point (627,731) and terminating at point (629,735). For vector 53, we calculate $\Delta X$ and $\Delta Y$, the length of the vector, as follows:

$$\Delta X = (629-627)_{10}$$
$$= 2_{10}$$
$$= 0000000010_2; \text{ and}$$
$$\Delta Y = (735-731)_{10}$$
$$= 4_{10}$$
$$= 0000000100_2.$$

Shift normalizing, we obtain:

| SHIFT COUNT | $\Delta X'$ | $\Delta Y'$ |
|---|---|---|
| 1 | 0000000100 | 0000001000 |
| 2 | 0000001000 | 0000010000 |
| 3 | 0000010000 | 0000100000 |
| 4 | 0000100000 | 0001000000 |
| 5 | 0001000000 | 0010000000 |
| 6 | 0010000000 | 0100000000 |
| 7 | 0100000000 | 1000000000 |

Thus, after shifting to the left a total of 7 times, a binary "1" will appear in the most significant bit position of the $\Delta Y'$ signal and the apparatus will thus select the $E_2$ output of time selector 44. As a result, the time taken to draw vector 53 will be very short, as befits such a small vector, and it will hence be drawn with approximately the same brightness as a maximum length vector.

It will be noted that although the actual $\Delta X$, $\Delta Y$ values of different vectors may vary by considerable amounts—indeed in the extreme case by as much as a factor of 1023—the normalized values are of the same order of magnitude. This results in a relative uniformity of drawing rates. It does not, however, result in identical drawing rates. In fact, in the worst case, drawing rates will vary by as much as $2\sqrt{2}$. Thus, some vectors, will be drawn slightly brighter than others, but the difference in brightness is minimal and, if objectionable, can be overcome by generating appropriate correction signals and applying them to the intensity control circuits of the CRT.

The circuit as described so far, is essentially similar to the prior art, which provided efficient vector generation but was unable to furnish "real-time" information concerning the precise position of the electron beam 26 during the integration process and was, thus, unable to efficiently handle edge violations and light pen strikes. The disclosed and claimed invention herein provides this capability with minimal additional hardware.

Returning to FIG. 3, in accordance with this invention, real-time tracking of the position of the beam is effected by incorporating a binary rate multiplier (BRM) 54 in the vector generator 11. As is well known, a binary rate multiplier is a circuit which, when loaded with an n-bit binary number M and pulsed with an input clock train, allows $M/(2^n)$ of these pulses to be transferred to the output of the device (i.e., $Pulses_{Out} = Pulses_{In} \times M/2^n$). For example, consider a 6-bit BRM (n=6). If such a BRM were loaded with the 6-bit number $M = 000111_2 (= 7_{10})$, then $$M/2^n = 7_{10}/2^6$$
$$= 7_{10}/64_{10}$$

In other words, the BRM would pass 7 out of every 64 incoming clock pulses. A description of a commercially available BRM, the SN7497, is contained in "TTL Data Book for Design Engineers", Second Edition, 1976, published by Texas Instruments at pages 7-102 through 7-106. While the BRM described in this publication is a 6-bit chip, two such units may be cascaded to provide 12-bit capability, of which only 10 bits would be active in the present implementation.

Returning to the binary rate multiplier 54, its clock pulse input is derived from the clock pulse generator 47 via the AND-gate 48 and an AND-gate 56. The other input to the AND-gate 56 is the output of the time selector 44 (i.e., the integration time period). Thus, the number of clock pulses received by the BRM 54 is directly related to the period of integration. More specifically, if the maximum integration period $E_9$ is selected (no normalization), 1024 clock pulses will be received by the BRM 54, the number of pulses received during the other time intervals decreasing by factors of 2 as one proceeds from $E_9$ to $E_0$.

The rate control number M is loaded into the BRM 54 from the normalized $\Delta X$ output of the normalization circuit 43. Accordingly, the number of output pulses of the BRM 54 is a function of both the integration period and the normalized value $\Delta X'$ of $\Delta X$. Expressed algebraically, $Pulses_{Out} = Pulses_{In} \Delta X'/2^n$.

Since n = 10 in the embodiment of FIG. 3, i.e., $\Delta X'$ is a 10-bit binary word, then $Pulses_{Out} = Pulses_{In} \Delta X'/1024$.

The number of input pulses, $Pulses_{In}$, as mentioned, is a function of the integration period which, as will be recalled, is a function of the number of normalization shifts.

The relationship between the various parameters will be better appreciated from Table II, below, where the first column represents the number of left shifts necessary to normalize a given $\Delta X$; the second column is the normalization multiplier, i.e., each shift to the left represents a multiplication by two; the third column represents the integration period corresponding to the number of normalization shifts (the times are based on an exemplary clock frequency of 20 mhz); the fourth column represents the number of input pulses ($Pulses_{In}$) to the BRM 54 (i.e., the number of clock pulses from clock pulse generator 47 occurring during the corresponding integration period); and the last column represents the multiplier of $\Delta X'$ in the BRM relationship (i.e., it represents the ratio $Pulses_{In}/1024$).

TABLE II

| No. of Normalization Shifts | Normalization Multiplier | Integration Period (μ sec.) | No. of Input Pulses | ΔX' MULT |
|---|---|---|---|---|
| 0 | 1 | 51.2($E_9$) | 1024 | 1 |
| 2 | 4 | 12.8 | 256 | 1/4 |
| 3 | 8 | 6.4 | 128 | 1/8 |
| 4 | 16 | 3.2 | 64 | 1/16 |
| 5 | 32 | 1.6 | 32 | 1/32 |
| 6 | 64 | .8 | 16 | 1/64 |
| 7 | 128 | .4 | 8 | 1/128 |
| 8 | 256 | .2 | 4 | 1/256 |
| 9 | 512 | .1($E_0$) | 2 | 1/512 |

As can be seen from Table II, the BRM 54 functions to divide $\Delta X'$ by the same factor which was used to multiply $\Delta X$. Thus, the BRM 54 essentially functions to "de-normalize" $\Delta X'$ such that the output of the BRM 54 is equal to $\Delta X$. The output of the BRM 54 is coupled via an AND gate 57 to the position register 42. The other input of the gate 57 is a signal, $\overline{LPEN}$ ("NOT" Light Pen) which enables the gate 57 so long as there is no light pen strike.

Assuming no light output strike, the output pulses from the BRM 54 will increment the position register 42 by an amount equal to $\Delta X$. Since the number previously stored in the position register 42 was the X coordinate position of the beginning point of the vector (e.g., $X_1$, FIG. 2), the number now stored in the X position register will be the X coordinate of the end of the vector (e.g., $X_2$, FIG. 2).

It should be noted that the position register 42 is incremented, pulse-by-pulse. Accordingly, the count in the position register 42 changes by one as the beam moves one unit across the screen. In other words, the count in the position register 42 exactly coincides with and tracks the X coordinate position of the beam as it draws a vector. If there is now a light pen strike, the gate 57 will be disabled whereby the stream of pulses to the position register 42 will cease and the register will be frozen at the X coordinate position of the light pen strike.

Edge violations occur when the beam crosses a boundary of the 1024 × 1024 grid. When this occurs, the count in the position register 42 will exceed 1023 resulting in an overflow from the register. This overflow condition is then fed to the computer 17 via the interface unit 16 so that corrective action may be taken.

The description so far has been in terms of the generation of positive vectors. The generation of negative vectors, however, is entirely analogous. As is conventional, such generation may include the use of an extra sign bit and "ones" complement logic. It will also include the use of count-up/count-down control of the position register 42. With up/down counting, edge violations will be indicated by either an underflow or overflow from the position register 42.

A complete cycle of operation will now be described with reference to the drawing of the vector 53 (FIG. 4). Both X and Y functions will be referred to, with those X(y) units previously referred to as performing X functions, now referred to as performing both X and Y functions, e.g., the X position register 42 and the Y position register 42.

Returning to FIG. 3, with the CRT beam 26 blanked, and the switch 41 open and the switch 31 closed, the computer 17, via the interface 16, first loads the values of $X_1$ and $Y_1$, 627 and 731, respectively, into the X and Y position registers 42. The X and Y position DAC's 27 then convert these digital values into analogue signals which are then applied to the deflexion coils 12, via the operational amplifiers 32, to deflect the beam 26 to the starting point (627, 731).

The computer 17, after a delay to allow the beam 26 to settle to the position of the starting point (627, 731), then loads $\Delta X$ and $\Delta Y$ into the normalization circuit 43, whereupon left shifting will occur until a one appears in the most significant bit position of either $\Delta X$ or $\Delta Y$. In the case of the vector 53, as described above, $\Delta X$ is equal to 000000010 and $\Delta Y$ is equal to 0000000100. Accordingly, 7 left shifts will be required to shift a one into the most significant bit position of the $\Delta Y$ signal. The normalized value of $\Delta X$ and $\Delta Y$, i.e., $\Delta X'$ and $\Delta Y'$, are thus equal to 0100000000 and 1000000000, respectively.

The normalized values $\Delta X'$ and $\Delta Y'$ are simultaneously applied to the vector DAC's 38 and to the BRM's 54. At the same time, the shift count of 7 is fed from the normalization circuit 43 to the time selector 44 to select an integration period. Since the normalization process resulted in $\Delta X$ and $\Delta Y$ being multiplied by a factor of 7, the selected period will be 1/128 of the maximum, i.e., the period $E_1$ will be selected (see Table II above).

The computer 17 now sends a start signal to the gate 56 to start the timing of the integration period. At this time, the computer 17 also causes unblanking of the beam 26 of the CRT 13. Simultaneously, under control of the time selector 44, switch 41 is closed and the switch 31 opened to apply the analogue output of the vector DAC's 38 to the operational amplifier 32 which are now functioning as integrators. As integration proceeds, the vector 53 is drawn upon the screen 21 of the CRT 13 until termination of the integration period.

Start of the integration period also enables the gates 56 controlling the clock stream into the BRM's 54. Accordingly, the BRM's 54 will now output pulses to the position registers 42 in accordance with the equation, $\text{Pulses}_{Out} = \text{Pulses}_{In} M/1024$, such that the registers are incremented by one for each unit in the 1024×1024 grid of the CRT traversed by the beam 26. Thus, the count in the registers 42 reflects the actual position of the beam during integration. Accordingly, if there is a light pen strike during this period, the count in the registers 42 will accurately indicate the coordinates at which the strike occurred. Note that upon a strike, the gates 57 are disabled, thereby freezing the registers 42 at the coordinates of the light pen. Similarly, any overflow or underflow from the registers 42, indicative of an edge violation, will result in freezing of the registers.

Assuming that no light pen strike occurs, the X BRM 54, in the case of the vector 53 will output 2 pulses and the Y BRM 54 will output 4 pulses. Accordingly, the count in the X register 42 which, at the start of integration, was equal to 627 will now be equal to 629, and the count in the Y resister, which originally was equal to 731, will now be equal to 735.

Termination of integration occurs upon the expiration of the selected integration period, in this case, the period $E_2$. At this time, in addition to disabling of the gate 56 to terminate the BRM count, the switch 31 is closed to terminate the integration process and the switch 41 is opened to clamp the beam at the position now stored in the position registers, i.e., $X_2 = 627$ and $Y_2 = 735$. The system is now ready to draw another vector starting from either the clamped position or a new position.

In summary, this invention provides a mechanism whereby an efficient analog vector generation scheme is enhanced by the addition of a small amount of circuitry to provide continuous information regarding beam position. This information is used to precisely and immediately detect display edge violations, and further makes information available to a host computer regarding beam position during light pen strikes. Further, the computer may interrogate the beam position registers at any time under program control to detect beam position, for instance at the end of a character string to define character string position limits or extents, to provide automatic "tab" facilities, etc.

A person skilled in the art may make various changes and substitutions to the layout of parts shown without departing from the spirit and scope of the invention.

What is claimed is:

1. A method of drawing vectors in a computer graphic system of the type wherein a vector is drawn by applying analogue deflexion signals to a display device to deflect an image-writing beam across the face of the display device, and wherein the vector is defined by first digital words defining the planar coordinates of the starting point of the vector and second digital words defining the displacement of the vector from said starting point, which method comprises:

(a) storing the first digital words in respective registers;

(b) converting the first digital words into first analogue signals to deflect the image-writing beam to the starting point of a vector to be drawn;

(c) normalizing the second digital words to values representative of a normalized drawing rate by multiplying them by a normalization factor N;

(d) converting the normalized values of the second digital words into second analogue voltages to deflect the image-writing beam at the normalized rate from the starting point towards the end point of the vector to be drawn;

(e) generating a pulse train wherein the number of pulses generated follows the relationship P = K/N, where:

P is the number of pulses generated;

K is a constant; and

N is the normalization factor;

(f) applying each normalized second word and the pulse train to a binary rate multiplier for each coordinate such that the output of each binary rate multiplier has the following relationship:

$P_o = P_i M/2^n$ where:

$P_o$ is the number of output pulses;

$P_i$ is the number of pulses in the pulse train;

M is the value of the normalized second digital word; and n is the number of bits in said normalized second word;

(g) applying the outputs of each binary rate multiplier to one of the registers to change the count thereof and hence the magnitude of the word stored therein so that the magnitude indicates the instantaneous position of the beam; and (h) terminating the drawing after a time interval selected such that the desired displacement is achieved.

2. The method of claim 1, further including the step of directing a light beam at the face of the display device and terminating the application of pulses to the registers upon the image writing beam reaching the location of the light beam.

3. The method of claim 1, which includes terminating the application of pulses to the registers upon an overflow or underflow count from any one thereof.

4. A vector generator for use with a computer graphics system of the type wherein a vector is drawn by applying analogue deflexion signals to a display device to deflect an image-writing beam across the face of the display device, and wherein the vector is defined by first digital words defining the planar coordinates of the starting point of the vector and second digital words defining the displacement of the vector from said starting point, which generator comprises:

(a) means for receiving the first digital words, storing them in respective registers and for converting said words into first analogue signals to deflect the image-writing beam to the starting point of a vector to be drawn;

(b) means for receiving the second digital words and for normalizing said second words to values representative of a normalized drawing rate by multiplying them by a normalization factor N;

(c) means for converting the normalized values of the second digital words into second analogue voltages to deflect the image-writing beam at the normalized rate from the starting position towards the end point of the vector to be drawn;

(d) means for generating a pulse train wherein the number of pulses generated follow the relationship
P=K/N
where:

P is the number of pulses generated;
K is a constant; and
N is the normalization factor;

(e) means for initiating the drawing of a vector and for terminating the drawing after a time interval selected such that the desired displacement is achieved; and (f) means for providing digital representations of the coordinates of the instantaneous position of the image-writing beam as the beam is moved from the starting point of the vector toward the end point thereof, said digital representations means including respective binary rate multipliers for each coordinate, each binary rate multiplier having a first input coupled to the pulse generating means for receiving input pulses therefrom, a second input coupled to means (b) for receiving therefrom a normalized second digital word, and an output coupled to one of the registers of means (a) to output pulses thereto in accordance with the following relationship:

$P_o = P_i M / 2^n$ where:

$P_o$ is the number of output pulses;
$P_i$ is the number of input pulses;
M is the value of the normalized second digital word fed to the binary rate multiplier; and
n is the number of bits in said normalized second digital word.

5. The vector generator of claim 4 wherein means (b) includes means for shifting each second word leftward, one bit at a time, until the most significant bit of one of the words comprises a binary "1", the normalization factor N being equal to $2^s$, where s is the number of leftward shifts.

6. The vector generator of claim 5, including:
a clock pulse generator;
a chain of serially-connected, divide-by-two stages connected to and drived by said clock pulse generator, each successive divide-by-two stage in said chain producing a timing signal having a period which is twice as long as the preceding stage;
means, responsive to the output of said shifting means, for selecting a particular one of the timing signals; and
means, responsive to the selected timing signal, for operating means (d) to initiate and terminate the drawing of the vector.

7. The vector generator of claim 6, wherein the pulse train generating means includes a gate responsive to the clock pulse generator and the selected time signal for transmitting therefrom only those clock pulses occurring within the selected time signal.

* * * * *